(12) United States Patent
Ito et al.

(10) Patent No.: US 7,585,435 B2
(45) Date of Patent: Sep. 8, 2009

(54) HIGH DENSITY COBALT-MANGANESE COPRECIPITATED NICKEL HYDROXIDE AND PROCESS FOR ITS PRODUCTION

(75) Inventors: Hiroyuki Ito, Fukui (JP); Takeshi Usui, Fukui (JP); Mamoru Shimakawa, Fukui (JP); Toyoshi Iida, Fukui (JP)

(73) Assignee: Tanaka Chemical Corporation, Fukui-Ken (JP)

( * ) Notice: Subject to any disclaimer, the term of this patent is extended or adjusted under 35 U.S.C. 154(b) by 0 days.

(21) Appl. No.: 11/243,820

(22) Filed: Oct. 5, 2005

(65) Prior Publication Data

US 2006/0081818 A1 Apr. 20, 2006

Related U.S. Application Data

(63) Continuation-in-part of application No. 10/003,916, filed on Nov. 2, 2001, now abandoned.

(30) Foreign Application Priority Data

Nov. 6, 2000 (JP) .............................. 2000-337873

(51) Int. Cl.
*H01M 4/32* (2006.01)
*C01G 53/04* (2006.01)

(52) U.S. Cl. ................. 252/518.1; 252/500; 252/182.1; 429/223; 429/224; 429/206; 423/599; 423/594

(58) Field of Classification Search .............. 252/518.1, 252/519.15, 521.2; 429/231.3, 223, 224, 429/206; 423/49, 605, 592.1, 594.3, 594.5, 423/594.19

See application file for complete search history.

(56) References Cited

U.S. PATENT DOCUMENTS

| 5,700,596 | A | | 12/1997 | Ikoma et al. ................. 429/206 |
| 5,788,943 | A | | 8/1998 | Aladjov .................. 423/594.19 |
| 6,013,390 | A | * | 1/2000 | Kimiya et al. ............... 429/206 |
| 6,086,843 | A | | 7/2000 | Ovshinsky et al. ........ 423/594.3 |
| 6,129,902 | A | * | 10/2000 | Sakamoto et al. ......... 423/594.4 |
| 6,153,334 | A | * | 11/2000 | Sakamoto et al. ............ 429/223 |
| 6,306,787 | B1 | | 10/2001 | Sato et al. ...................... 501/94 |
| 6,416,903 | B1 | * | 7/2002 | Fierro et al. ................. 429/223 |
| 6,551,744 | B1 | | 4/2003 | Ohzuku et al. .............. 429/223 |

FOREIGN PATENT DOCUMENTS

| JP | A-10-97856 | | 4/1989 |
| JP | 08-153513 | * | 6/1996 |
| JP | 09-129230 | | 5/1997 |

(Continued)

*Primary Examiner*—Stanley Silverman
*Assistant Examiner*—Kallambella Vijaykumar
(74) *Attorney, Agent, or Firm*—Ohlandt, Greeley, Ruggiero & Perle, L.L.P.

(57) ABSTRACT

The present invention provides high density cobalt-manganese coprecipitated nickel hydroxide, particularly having a tapping density of 1.5 g/cc or greater, and a process for its production characterized by continuous supply of an aqueous solution of a nickel salt which contains a cobalt salt and a manganese salt, of a complexing agent and of an alkali metal hydroxide, into a reactor either in an inert gas atmosphere or in the presence of a reducing agent, continuous crystal growth and continuous removal.

10 Claims, 2 Drawing Sheets

FOREIGN PATENT DOCUMENTS

| JP | 10-027611 | * | 1/1998 |
| JP | A-10-081521 | | 3/1998 |
| JP | 10-255787 | | 9/1998 |
| JP | 10-265225 | | 10/1998 |
| JP | A-10-316431 | | 12/1998 |
| JP | 11-312519 | | 11/1999 |
| JP | 11-317224 | | 11/1999 |

* cited by examiner

HIGH DENSITY COBALT-MANGANESE COPRECIPITATED NICKEL HYDROXIDE AND PROCESS FOR ITS PRODUCTION

This application is a Continuation-In-Part of and claims priority from U.S. application Ser. No. 10/003,916, filed on Nov. 2, 2001 now abandoned.

BACKGROUND OF THE INVENTION

1. Field of the Invention

The present invention relates to high density cobalt-manganese coprecipitated nickel hydroxide with excellent charge/discharge cycle properties and high temperature stability, which is suitable as a positive electrode active material for a lithium ion secondary battery, and to a process for its production.

2. Background of the Invention

Recently, attempts have been made to add other components to nickel hydroxide used as the starting material for production of lithium nickel oxide, for the purpose of including additional components with lithium nickel oxide for use as the positive electrode active material of lithium ion secondary batteries in order to improve their charge/discharge cycle properties and high temperature stability (JP-A 10-316431).

However, with the conventional process it has been difficult to obtain nickel hydroxide particles containing cobalt and manganese as the additional components while still maintaining density sufficient for current requirements.

The above-mentioned conventional production process gives particles that are inadequate for use in the positive electrode of a lithium ion secondary battery, and thus it has become an important goal to develop high density nickel hydroxide with a high cobalt and manganese content that exhibits a stable high utilization rate at high temperatures and low cycle deterioration.

SUMMARY OF THE INVENTION

As a result of diligent research directed toward achieving this goal, the present inventors have completed the present invention upon finding that it is possible to obtain high density cobalt-manganese coprecipitated nickel hydroxide by continuously supplying a complexing agent and an alkali metal hydroxide to an aqueous solution of a nickel salt containing a cobalt salt and a manganese salt while adequately stirring in an aqueous solution either in an inert gas atmosphere or in the presence of an appropriate reducing agent, and accomplishing continuous crystal growth and continuous removal.

In other words, the present invention relates to high density cobalt-manganese coprecipitated nickel hydroxide with a tapping density of 1.5 g/cc or greater. The invention further relates to high density cobalt-manganese coprecipitated nickel hydroxide characterized in that, where the cobalt-manganese coprecipitated nickel hydroxide is represented as $(Ni_{(1-x-y)}Co_xMn_y)(OH)_2$, $1/10 \leq x \leq 1/3$ and $1/20 \leq y \leq 1/3$.

Accordingly, the present invention provides spherical particles of high density cobalt-manganese coprecipitated nickel hydroxide that are free of non-spherical particles of the same; wherein the cobalt-manganese coprecipitated nickel hydroxide is represented by the formula:

$(Ni_{(1-x-y)}Co_xMn_y)(OH)_2$ wherein $1/10 \leq x \leq 1/3$ and $1/20 \leq y \leq 1/3$; and wherein the particles have a tapping density of 1.5 g/cc or greater and a mean particle size in the range of 5-20 μm.

The invention still further relates to a process for production of high density cobalt-manganese coprecipitated nickel hydroxide, characterized by continuous supply of an aqueous solution of a nickel salt which contains a cobalt salt and a manganese salt, of a complexing agent and of an alkali metal hydroxide, into a reactor either in an inert gas atmosphere or in the presence of a reducing agent, continuous crystal growth and continuous removal. It particularly relates to this process wherein the reducing agent is hydrazine. Accordingly, the present invention provides a process for production of high density cobalt-manganese coprecipitated nickel hydroxide having the steps of:

continuously supplying an aqueous solution of a nickel salt which contains a cobalt salt and a manganese salt of a complexing agent and an alkali metal hydroxide into a reactor either in an inert gas atmosphere or in the presence of a reducing agent;

continuously growing crystals of said particles; and continuously removing crystals of said particles from said reactor.

The invention also includes $Li(Ni_{(1-x-y)}Co_xMn_y)O_2$ obtained by calcining a cobalt-manganese coprecipitated nickel hydroxide according to the invention with an appropriate lithium salt.

DETAILED DESCRIPTION OF THE INVENTION

High Density Cobalt-Manganese Coprecipitated Nickel Hydroxide

Figure 1:
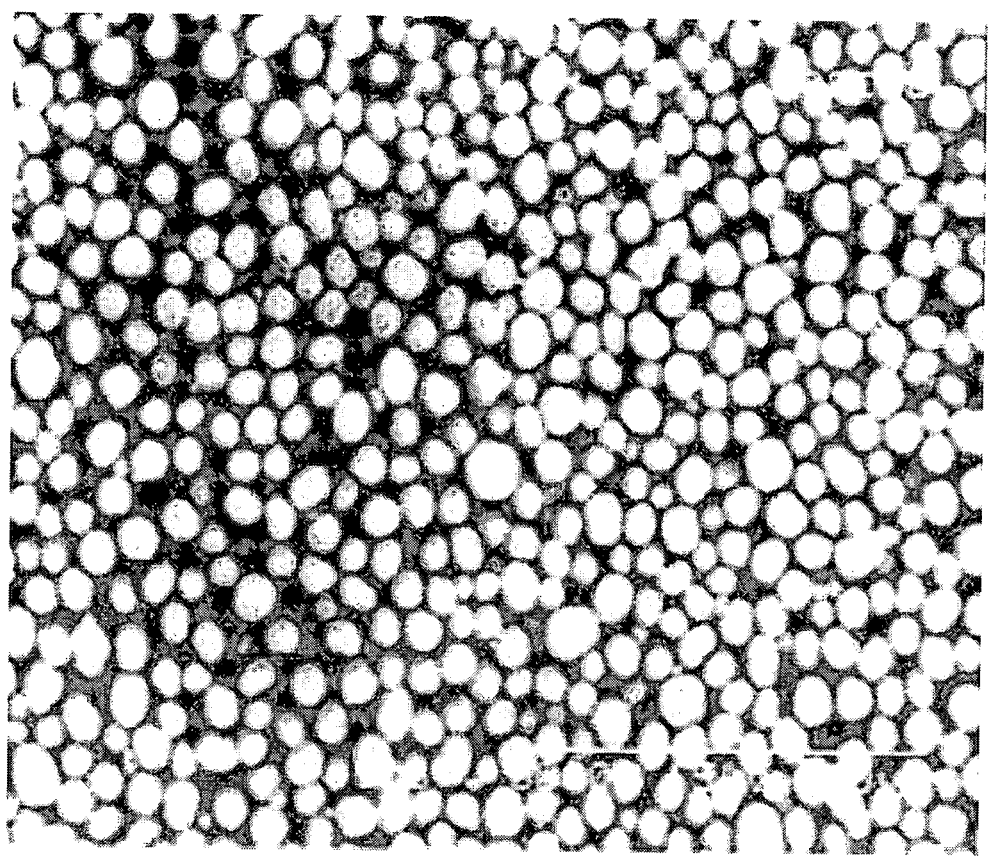
FIG. 1 is an electron micrograph of high density cobalt-manganese coprecipitated nickel hydroxide according to the invention.
Figure 2:
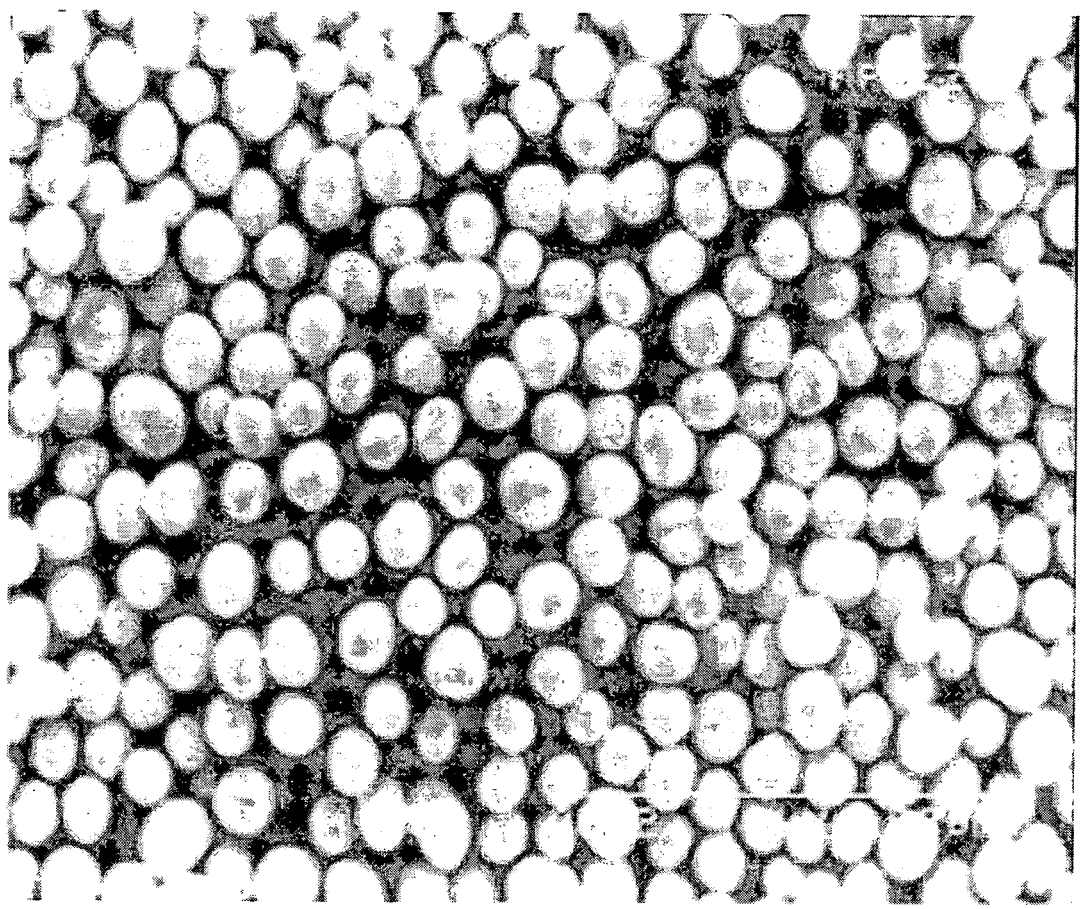
FIG. 2 is an electron micrograph of high density cobalt-manganese coprecipitated nickel hydroxide according to the invention at a higher magnification.

The cobalt-manganese coprecipitated nickel hydroxide of the invention is characterized by having high density, and specifically, a density of 1.5 g/cc or greater. The specific surface area of the cobalt-manganese coprecipitated nickel hydroxide of the invention is in the range of 8-20 m²/g and, as shown in FIG. 1 and FIG. 2, respectively at lower and higher magnifications, it is spherical with mean particle size in the range of 5-20 μm. Although the content of the cobalt and manganese as additional components is not particularly restricted, the ranges are preferably $1/10 \leq x \leq 1/3$ and $1/20 \leq y \leq 1/3$ if represented by $(Ni_{(1-x-y)}Co_xMn_y)(OH)_2$.

Production Process

The production process for the cobalt-manganese coprecipitated nickel hydroxide of the invention accomplishes production of nickel hydroxide with high density of coprecipitated cobalt and manganese by continuous supply of an aqueous solution of a nickel salt containing a cobalt salt (cobalt (II) ion) and a manganese salt (manganese (II) ion), of a complexing agent and of an alkali metal hydroxide, to a reactor with adequate stirring either in an inert gas atmosphere or in the presence of a reducing agent, continuous crystal growth and continuous removal of the resulting precipitate.

Here, the salt concentration, complexing agent concentration, pH and temperature in the reactor are kept within a fixed range to satisfactorily control the powder properties, such as the crystallinity, tapping density, specific surface area, particle size, etc.

Specifically, there is obtained high density cobalt-manganese coprecipitated nickel hydroxide wherein, as represented by $(Ni_{(1-x-y)}Co_xMn_y)(OH)_2$, $1/10 \leq x \leq 1/3$ and $1/20 \leq y \leq 1/3$, the tapping density is 1.5 g/cc or greater, the specific surface area is 8-30 m²/g and the mean particle size is 5-20 μm.

For the high density cobalt-manganese coprecipitated nickel hydroxide, the salt concentration in the vessel is preferably kept in the range of 50-200 mS/cm±5 mS/cm and the ammonium ion concentration is preferably kept in the range of 1-10 g/L±0.5 g/L. The reaction pH is preferably kept in the range of 11.0-13.0±0.05, and the reaction temperature is preferably kept in the range of 25-80° C.±0.5° C.

As salt concentration adjustors there may be mentioned sodium chloride, potassium chloride, sodium sulfate, potassium sulfate, ammonium chlorate, ammonium sulfate and the like. As calcium salts there may be used nitrate, acetate or oxalate salts.

The production process of the invention is based on the high density nickel hydroxide production process described in JP-A 10-97856 but is characterized by further adding an appropriate reducing agent. That is, while adequate stirring is usually necessary, this results in inclusion of air, etc. which causes partial oxidation of the unstable cobalt (II) ion or manganese (II) ion and prevents a product with sufficient density from being obtained. In order to control such oxidation, the production process is carried out either in an inert gas atmosphere or in the presence of a reducing agent. The added reducing agent is not particularly restricted, but hydrazine is preferred.

In most cases when precipitating solid crystals from aqueous solution, a high concentration gradient results in abundant precipitation of fine particles. That is, the mechanism by which solid crystals precipitate from aqueous solution involves the aqueous solution passing from presaturation→saturation→supersaturation→crystal precipitation. Growth of crystals requires this mechanism to be effected as slowly as possible, and a low concentration gradient near saturation is necessary for this purpose. Nevertheless, the solubility curves for hydroxides of nickel, cobalt and manganese vary considerably according to the pH. In other words, the metal ion concentration gradient is very large with respect to the pH. Only production of fine particles therefore can be expected by ordinary methods. According to the invention, however, the metal ions are in a complex salt with ammonium so that the concentration gradient of the metal ions with respect to the pH is reduced in aqueous solution to achieve growth of particles.

With pH control alone, decomposition and evaporation of ammonia alters the ammonium ion concentration in the solution, such that generation of crystal nuclei produced from the ammonium complex salt becomes unstable. Only by controlling the ammonium ion concentration of the solution does generation of crystal nuclei become constant, so that uniform growth of particles occurs. In order to maintain such a mechanism, the ammonium ion source and alkali metal hydroxide must consistently match the necessary amount of metal ion, and therefore the reaction process is preferably carried out in a continuous manner. By speeding up the stirring rate, an abrading effect also occurs between the particles, and this repeated abrasion and growth result in fluidized, spherical high density particles.

The ammonium ion source for the reaction as a complexing agent according to the invention is used as a reaction intermediate, as represented by reaction formulas (1) and (2). Here, the nickel salt, ammonium ion source and alkali metal hydroxide are nickel sulfate, ammonia and sodium hydroxide, respectively. (Cobalt and manganese are omitted in order to simplify the formulas, but they likewise progress through ammonium complex salts.) As is apparent from the formulas, 4 equivalents of ammonia are not necessary, as about 0.5 equivalent at most is sufficient.

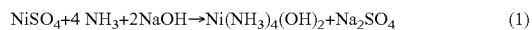

$$NiSO_4 + 4\,NH_3 + 2NaOH \rightarrow Ni(NH_3)_4(OH)_2 + Na_2SO_4 \quad (1)$$

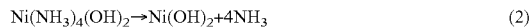

$$Ni(NH_3)_4(OH)_2 \rightarrow Ni(OH)_2 + 4NH_3 \quad (2)$$

EXAMPLE 1

After placing 450 L of water in a 500 L cylindrical reactor equipped with an overflow pipe and a stirrer provided with two 250φ propeller type stirring blades, a 30% sodium hydroxide solution was added to a pH of 12.6 and the temperature was kept at 50° C. while stirring at a speed of 320 rpm.

Next there were simultaneously added to the reactor in a continuous manner a solution containing a mixture of 1.7 mol/L nickel sulfate solution, 1.5 mol/L cobalt sulfate solution and 1.1 mol/L manganese sulfate aqueous solution in a volume ratio of 35:20:9 at a flow rate of 200 cc/min, a 6 mol/L ammonium sulfate solution at 63 cc/min and a 1 wt % hydrazine aqueous solution at 10 cc/min.

Also, 30% sodium hydroxide was intermittently added until the solution in the reactor reached a pH of 12.6, to form cobalt-manganese coprecipitated nickel hydroxide particles.

After 120 hours when the reactor reached a steady state, the cobalt-manganese coprecipitated nickel hydroxide particles were continuously removed for 24 hours from the overflow pipe and washed, filtered and dried at 100° C. for 15 hours to obtain cobalt-manganese coprecipitated nickel hydroxide dry powder with a component ratio of Ni:Co:Mn=60:30:10.

The tapping density of the obtained cobalt-manganese coprecipitated nickel hydroxide powder was measured in the manner described below.

Sample preparation: The cobalt-manganese coprecipitated nickel hydroxide powder obtained above was used in the manner described below.

The mass [A] of a 20 mL cell [C] was measured, and the crystals were allowed to naturally fall into the cell through a 48 mesh filter to fill it. The mass [B] and filling volume [D] of the cell were measured after tapping 200 times using a "TAP DENSER KYT-3000" by Seishin Enterprise Co., Ltd. with a mounted 4 cm spacer. The following equations were used for calculation.

Tapping density=$(B-A)/D$ g/ml

Bulk density=$(B-A)/C$ g/ml

Measurement results: Tapping density=1.91 g/cc

EXAMPLE 2

Cobalt-manganese coprecipitated nickel hydroxide with a component ratio of Ni:Co:Mn=50:30:20 was produced and the tapping density thereof measured under the same conditions as Example 1, except that the nickel sulfate solution, cobalt sulfate solution and manganese sulfate solution were mixed in a volume ratio of 30:20:18 and the pH of the reaction solution used to form the cobalt-manganese coprecipitated nickel hydroxide particles was 12.4. The tapping density was 1.71 g/cc.

EXAMPLE 3

After placing 13 L of water in a 15 L cylindrical reactor equipped with an overflow pipe and a stirrer provided with one 70.phi. paddle type stirring blade, a 30% sodium hydroxide solution was added to a pH of 10.9 and the temperature was kept at 50° C. while stirring at a speed of 1000 rpm. Nitrogen gas was also continuously supplied to the reactor at a flow rate of 0.5 L/min, and the atmosphere in the reactor was replaced with a nitrogen atmosphere. Next there were simultaneously added to the reactor in a continuous manner a solution containing a mixture of 1.7 mol/L nickel sulfate solution, 1.5 mol/L cobalt sulfate solution and 1.1 mol/L manganese sulfate aqueous solution in a volume ratio of Ni:Co:Mn=1:1:1 (molar ratio) at a flow rate of 12 cc/min and a 6 mol/L ammonium sulfate solution at 1.2 cc/min. Also, 30% sodium hydroxide was intermittently added until the solution in the reactor reached a pH of 10.9, to form cobalt-manganese coprecipitated nickel hydroxide particles. After 120 hours when the reactor reached a steady state, the cobalt-manganese coprecipitated nickel hydroxide particles were continuously removed for 24 hours from the overflow pipe and washed, filtered and dried at 100° C. for 15 hours to obtain cobalt-manganese coprecipitated nickel hydroxide dry powder with a component ratio of Ni:Co:Mn=1:1:1. The tapping density was 1.82 g/cc.

COMPARATIVE EXAMPLE 1

After placing 450 L of water in a 500 L cylindrical reactor equipped with an overflow pipe and a stirrer provided with one 250.phi. propeller type stirring blade, a 30% sodium hydroxide solution was added to a pH of 12.6 and the temperature was kept at 50° C. while stirring at a speed of 350 rpm. Next there were simultaneously added to the reactor in a continuous manner a solution containing a mixture of 1.7 mol/L nickel sulfate solution, 1.5 mol/L cobalt sulfate solution and 1.1 mol/L manganese sulfate aqueous solution in a volume ratio of 35:20:9 at a flow rate of 200 cc/min and a 6 mol/L ammonium sulfate solution at 63 cc/min. Also, 30% sodium hydroxide was intermittently added until the solution in the reactor reached a pH of 12.6, to form cobalt-manganese coprecipitated nickel hydroxide particles. After 120 hours when the reactor reached a steady state, the cobalt-manganese coprecipitated nickel hydroxide particles were continuously removed for 24 hours from the overflow pipe and washed, filtered and dried at 100° C. for 15 hours to obtain cobalt-manganese coprecipitated nickel hydroxide dry powder with a component ratio of Ni:Co:Mn=60:30:10. The tapping density was 1.40 g/cc.

COMPARATIVE EXAMPLE 2

Cobalt-manganese coprecipitated nickel hydroxide with a component ratio of Ni:Co:Mn=50:30:20 was produced and the tapping density thereof measured under the same conditions as Comparative Example 1, except that the nickel sulfate solution, cobalt sulfate solution and manganese sulfate solution were mixed in a volume ratio of 30:20:18 and the pH of the reaction solution used to form the cobalt-manganese coprecipitated nickel hydroxide particles was 12.4. The tapping density was 1.33 g/cc.

EFFECT OF THE INVENTION

According to the present invention it is possible to obtain high density cobalt-manganese coprecipitated nickel hydroxide having high density, and particularly a tapping density of 1.5 g/cc or greater, by continuous supply of an aqueous solution of a nickel salt which contains a cobalt salt and a manganese salt, of a complexing agent and of an alkali metal hydroxide, into a reactor either in an inert gas atmosphere or in the presence of a reducing agent, continuous crystal growth and continuous removal.

What is claimed is:

1. Spherical particles of high density cobalt-manganese coprecipitated nickel hydroxide for the production of the positive electrode active material of a lithium ion secondary battery that are free of non-spherical particles of the same; wherein said cobalt-manganese coprecipitated nickel hydroxide is represented by the formula:

$$(Ni_{(1-x-y)}Co_xMn_y)(OH)_2$$

wherein $1/10 \leq x \leq 1/3$ and $1/20 \leq y \leq 1/3$; and wherein said particles have a tapping density of 1.5 g/cc or greater and a mean particle size in the range of 5-20 μm.

2. Spherical particles of high density cobalt-manganese coprecipitated nickel hydroxide for the production of the positive electrode active material of a lithium ion secondary battery that are free of non-spherical particles of the same, wherein said particles have a tapping density of 1.5 g/cc or greater and a mean particle size in the range of 5-20 μm, wherein said cobalt-manganese coprecipitated nickel hydroxide is represented by the formula:

$$(Ni_{(1-x-y)}Co_xMn_y)(OH)_2$$

wherein $1/10 \leq x \leq 1/3$ and $1/20 \leq y \leq 1/3$;
prepared by a process comprising the steps of:
  continuously supplying an aqueous solution of a nickel salt which contains a cobalt salt and a manganese salt of a complexing agent and an alkali metal hydroxide into a reactor either in an inert gas atmosphere or in the presence of a reducing agent;
  continuously growing crystals of said particles; and
  continuously removing crystals of said particles from said reactor.

3. The spherical particles of claim 2, wherein said reducing agent is hydrazine.

4. A process for production of high density cobalt-manganese coprecipitated nickel hydroxide of claim 1, comprising the steps of:
  continuously supplying an aqueous solution of a nickel salt which contains a cobalt salt and a manganese salt, a complexing agent, and an alkali metal hydroxide into a reactor either in an inert gas atmosphere or in the presence of a reducing agent;
  continuously growing crystals of said particles; and
  continuously removing crystals of said particles from said reactor.

5. The process of claim 4 wherein said reducing agent is hydrazine.

6. The process of claim 4, wherein the salt concentration in said reactor is kept in a range of 50-200 mS/cm±5 mS/cm, wherein the ammonium ion concentration is kept in a range of 1-10 g/L±0.5 g/L, wherein the reaction pH is kept in a range of 11.0-13.0±0.05, wherein the reaction temperature is kept at 25-80° C.±0.5° C.

7. The spherical particles of claim 1, wherein said particles have a surface area of 8 to 20 m²/g.

8. The spherical particles of claim 2, wherein said particles have a surface area of 8 to 20 m²/g.

9. The process of claim 4, wherein said complexing agent is a source of ammonium ion.

10. The spherical particles of claim 2, wherein said complexing agent is a source of ammonium ion.

* * * * *

UNITED STATES PATENT AND TRADEMARK OFFICE
CERTIFICATE OF CORRECTION

PATENT NO. : 7,585,435 B2 Page 1 of 1
APPLICATION NO. : 11/243820
DATED : September 8, 2009
INVENTOR(S) : Ito et al.

It is certified that error appears in the above-identified patent and that said Letters Patent is hereby corrected as shown below:

Column 6, Line 29:
"salt" should read "salt,"
Please delete the word "of".

Column 6, Line 30:
"agent" should read "agent,"

Signed and Sealed this

Seventeenth Day of November, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,585,435 B2 | Page 1 of 1 |
| APPLICATION NO. | : 11/243820 | |
| DATED | : September 8, 2009 | |
| INVENTOR(S) | : Ito et al. | |

It is certified that error appears in the above-identified patent and that said Letters Patent is hereby corrected as shown below:

On the title page item [75] Inventors:
Please delete city "Fukui" should read "Fukui-shi". Please make this correction for all the inventors listed.

Signed and Sealed this

Twenty-third Day of November, 2010

David J. Kappos
*Director of the United States Patent and Trademark Office*